(12) United States Patent
Cho et al.

(10) Patent No.: US 9,556,065 B2
(45) Date of Patent: Jan. 31, 2017

(54) TRANSPARENT CONDUCTIVE LAYER AND PREPARATION METHOD THEREOF

(75) Inventors: Hyun Nam Cho, Gyeonggi-do (KR); Ji Hoon Yoo, Gyeonggi-do (KR); Kwang Choon Chung, Gyeonggi-do (KR)

(73) Assignee: Inktec Co., Ltd., Ansan-si (KR)

( * ) Notice: Subject to any disclaimer, the term of this patent is extended or adjusted under 35 U.S.C. 154(b) by 1209 days.

(21) Appl. No.: 12/663,933

(22) PCT Filed: Jun. 13, 2008

(86) PCT No.: PCT/KR2008/003352
§ 371 (c)(1),
(2), (4) Date: Mar. 1, 2010

(87) PCT Pub. No.: WO2008/153356
PCT Pub. Date: Dec. 18, 2008

(65) Prior Publication Data
US 2010/0166948 A1    Jul. 1, 2010

(30) Foreign Application Priority Data

Jun. 15, 2007  (KR) .................. 10-2007-0059119

(51) Int. Cl.
*C03C 17/42* (2006.01)
*C03C 17/36* (2006.01)
(Continued)

(52) U.S. Cl.
CPC .......... *C03C 17/3405* (2013.01); *C03C 17/42* (2013.01); *B32B 15/018* (2013.01); *C03C 17/3613* (2013.01); *C03C 17/3644* (2013.01)

(58) Field of Classification Search
CPC .. C03C 2217/94; C03C 17/3613; B32B 15/04; B32B 15/018; B32B 17/10211; B32B 2307/202; C23C 14/08
(Continued)

(56) References Cited

U.S. PATENT DOCUMENTS

| 4,542,214 A | 9/1985 | Bechara |
| 5,764,401 A * | 6/1998 | Udaka et al. .............. 359/270 |

(Continued)

FOREIGN PATENT DOCUMENTS

| EP | 0378917 A1 * | 7/1990 |
| JP | 6264007 A | 3/1987 |

(Continued)

OTHER PUBLICATIONS

Tsunashima et al., Preparation of Tin Doped Indium Oxide Thin Films by Thermal Decomposition of Metal Octanoates, Chemistry Letters, p. 855-856, Chemical Society of Japan.*

(Continued)

*Primary Examiner* — Francisco Tschen
(74) *Attorney, Agent, or Firm* — The Webb Law Firm (57) ABSTRACT

The present invention relates to a method for producing a transparent conductive film in a form of complex multi-layer film comprising at least one layer using a silver complex compound having special structure and an organic acid metal salt. The method for producing the transparent conductive film, using one or more solution processes, comprises steps of (1) forming a transparent layer over a transparent substrate to improve transmittance; and (2) forming the conductive layer allowing conductivity, and further comprises a step of (3) forming a protective layer to prevent a change over time of the conductive layer. According to the present invention, it is possible to achieve large-scaled transparent conductive film having excellent conductivity and transmittance, as well as simple processes.

20 Claims, 2 Drawing Sheets

(51) Int. Cl.
 *B32B 15/01* (2006.01)
 *C03C 17/34* (2006.01)
(58) Field of Classification Search
 USPC .............................................. 427/108; 1/108
 See application file for complete search history.

(56) References Cited

U.S. PATENT DOCUMENTS

| | | | |
|---|---|---|---|
| 5,908,585 | A | 6/1999 | Shibuta |
| 6,117,366 | A | 9/2000 | Park et al. |
| 6,143,418 | A | 11/2000 | Takamiya et al. |
| 2003/0019859 | A1* | 1/2003 | Sol .................... B32B 17/10174 219/203 |
| 2004/0067444 | A1* | 4/2004 | Wakabayashi ...... G02F 1/13439 430/311 |
| 2004/0113547 | A1* | 6/2004 | Son et al. .................... 313/504 |
| 2005/0026316 | A1* | 2/2005 | Kidokoro et al. .............. 438/21 |
| 2005/0183769 | A1* | 8/2005 | Nakagawa et al. .......... 136/263 |
| 2007/0085471 | A1* | 4/2007 | Cok .............................. 313/503 |
| 2008/0152931 | A1* | 6/2008 | Padiyath et al. ............. 428/457 |
| 2009/0120800 | A1 | 5/2009 | Chung et al. |

FOREIGN PATENT DOCUMENTS

| | | | |
|---|---|---|---|
| JP | 6338381 A | | 12/1994 |
| JP | 10-110123 A | | 4/1998 |
| JP | 2000-202941 A | | 7/2000 |
| JP | 2004203941 A | | 7/2004 |
| KR | 1999-011487 A | | 2/1999 |
| KR | 1999-0036350 A | | 5/1999 |
| KR | 1999-0064113 A | | 7/1999 |
| KR | 10-2000-0009405 A | | 2/2000 |
| KR | 10-2001-0028944 A | | 4/2001 |
| KR | 1020060090180 A | | 8/2006 |
| WO | WO 2006093398 A1 * | | 9/2006 |

OTHER PUBLICATIONS

Kim et al. Highly c-axis oriented ZnO film on silica glass using zinc napththenate precursor, Journal of Materials Science, 40, 2005, 237-239.*

Hwang et al., Transparent titanium dioxide film with nanocrystalline structure by using titanium naphthenate, Journal of Material Science Letters 22, 2003, 307-309.*

Machine TRanslation of EP 0252489 A2, Jan. 1988, Hoffmann Winfried, Retrieved online May 17, 2016.*

Abe et al., Titanium-doped indium oxide films prepared by d.c. magnetron sputtering using ceramic target, J.Mater Sci., 2006, 41,7580-7584.*

* cited by examiner

TRANSPARENT CONDUCTIVE LAYER AND PREPARATION METHOD THEREOF

TECHNICAL FIELD

The present invention relates to a method for producing a transparent conductive film in a form of complex multi-layer film comprising at least one layer using a silver complex compound having special structure and an organic acid metal salt, and in particular to a transparent conductive film which has excellent resistance characteristics and transmittance via a solution process and a method for producing the same.

BACKGROUND ART

Generally, the transparent conductive film is used as a necessary component of electric/electronic equipments such as means for applying power supply to a display device, a layer for shielding electromagnetic waves of consumer electronics, and a transparent electrode in a variety of display fields such as LCD, OLED, FED, PDP, a flexible display and an electronic paper. Now, as a material of the transparent conductive layer, an inorganic oxide conductive material such as ITO (Indium-Tin oxide), ATO (Antimony-Tin Oxide), AZO (Antimony-zinc Oxide) is used.

If the transparent conductive film is produced by sputtering method, ion beam method, or vapor deposition method which are typically used, it is possible to produce the conductive layer having higher conductivity and excellent transmittance. However, a cost accompanied by provision of vacuum equipments is larger and thus causes mass production and larger scale to be difficult, as well as the transparent substrate such as a plastic film is constricted because it requires low temperature process. In accordance with conditions such as oxygen partial pressure and temperature upon depositing by the sputtering process, the transmittance and resistance of the thin film can be rapidly changed as is changed the composition of the transparent conductive film. Therefore, it was proposed to prepare the transparent conductive film by wet-coating such as spin coating, spray coating, deposit coating, and printing which are suitable for lower cost and large-scale, and then sintering. For example, there is disclosed a transparent conductive film prepared by using metal particles and a binder in Korean Patent Laid-open No. 1999-011487, a composition for the transparent conductive film adding hollow carbon nanofiber into tin oxide in Korean Patent Laid-open No. 1999-064113, and a spray solution for forming a transparent conductive and selective light adsorption film adding neodymium oxide into tin oxide or indium oxide in Korean Patent Laid-open No. 2000-009405. Further, there is disclosed a method of producing a transparent conductive layer forming solution containing metal nanoparticles such as gold and silver.

The surface resistance of the transparent conductive film produced by the above method is as high as $10^3$ to $10^4$ $\Omega/\square$ and is increased over time due to changes in the surrounding environment and thus an initial conductivity is not maintained, whereby it is limited to use the transparent conductive film.

Therefore, the inventors can reach the present invention as a result of an effort to solve such problems. That is, the present invention relates to a method for producing the transparent conductive film in a form of complex multi-layer comprising at least one layer using a silver complex compound having special structure and an organic acid metal salt, and in particular to a transparent conductive film which has excellent resistance characteristics and transmittance via a solution process and a method for producing the same.

DISCLOSURE

Technical Problem

As a result of efforts to address such problems, the inventors can provide a transparent conductive film which has excellent resistance characteristics and transmittance by forming the transparent conductive film in a form of complex multi-layer film comprising at least one layer using silver complex compound having special structure and organic acid metal salt and a method for producing the same.

Further, the present invention can provide a method for easily producing a transparent conductive film in a form of complex multi-layer film via a solution process.

Further, the present invention can provide large scale transparent conductive film which has excellent conductivity and transmittance, as well as simple processes.

Technical Solution

The present invention relates to a method of producing a transparent conductive film in a form of complex multi-layer film comprising at least one layer using a silver complex compound having special structure and an organic acid metal salt, and in particular to a transparent conductive film which has excellent resistance characteristics and transmittance via a solution process.

Hereinafter, the present invention will be described in detail.

Figure 1:
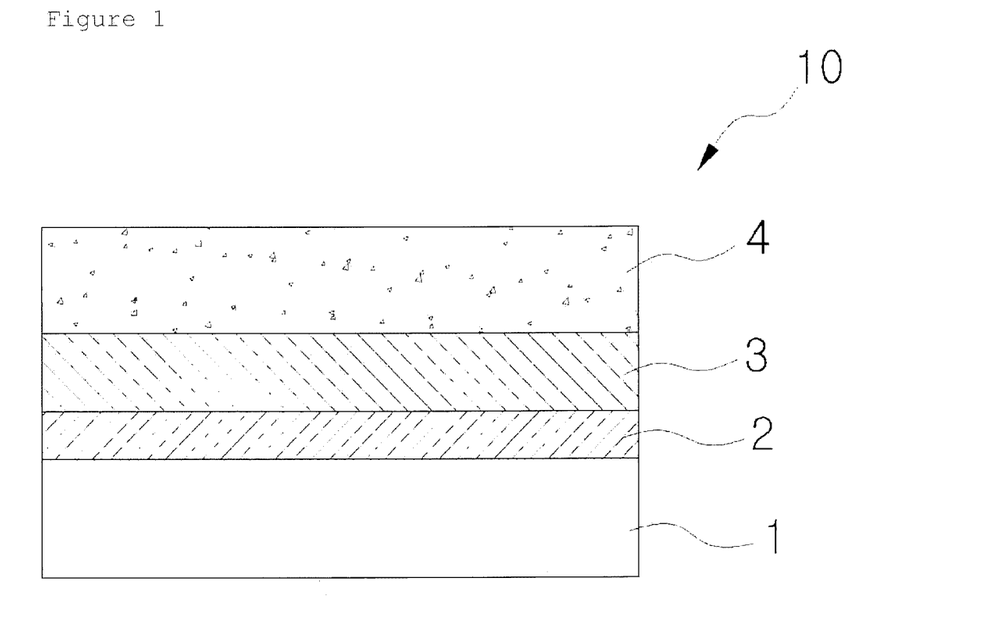
FIG. 1 is a sectional view showing a transparent conductive layer according to the present invention.
Figure 2:
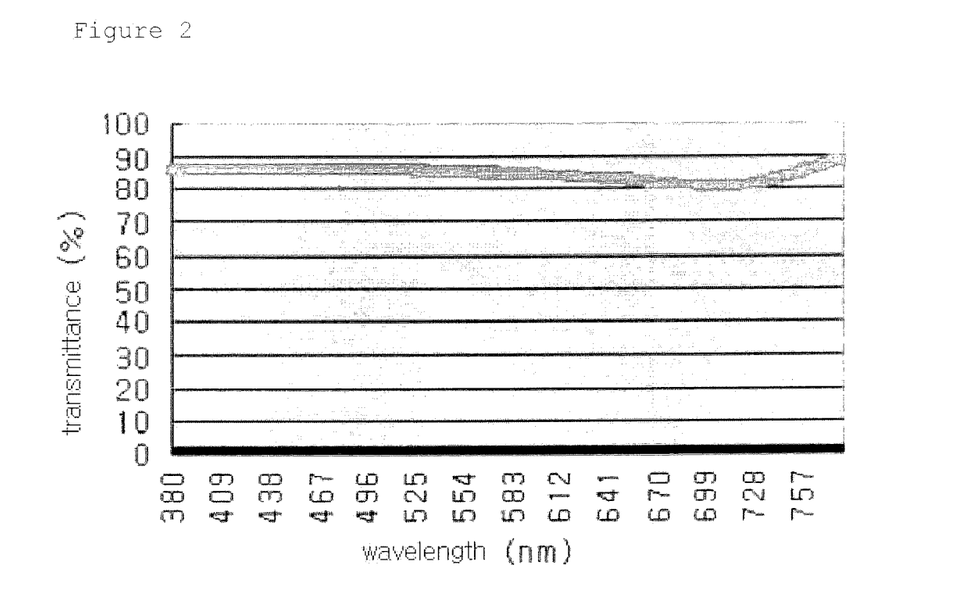
FIG. 2 is a graph illustrating a result of transmittance measurement according to Embodiment 18 of the present invention.
Figure 3:
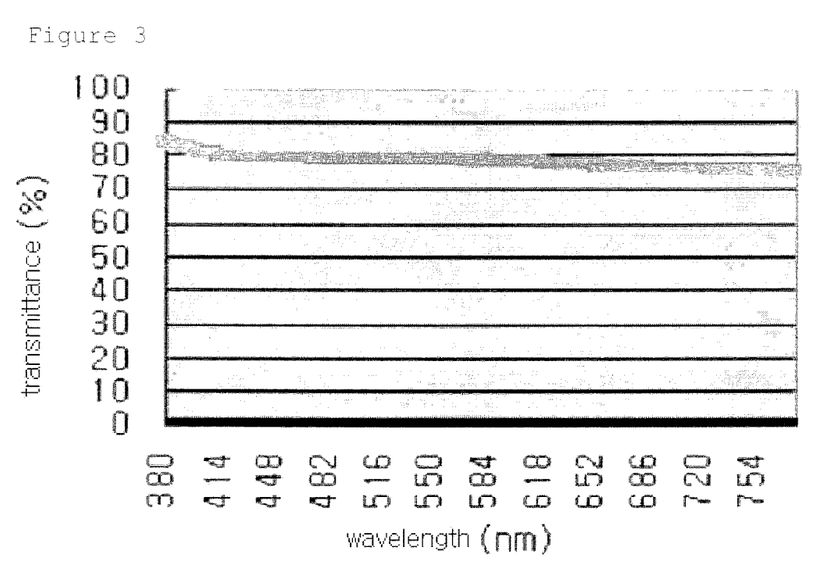
FIG. 3 is a graph illustrating a result of transmittance measurement according to Embodiment 23 of the present invention.

As shown in FIG. 1, the method for producing the transparent conductive film according to the present invention produces a complex multi-layer film comprising at least one layer using one or two or more of silver complex compound and one or two or more of organic acid metal salt. The method, using one or more solution processes, comprises steps of (1) forming the transparent layer 2 on the transparent substrate 1 to improve transmittance; and (2) forming the conductive layer 3 allowing conductivity, and further comprises a step of (3) forming the protective layer 4 for preventing changes of the conductive layer over time. Though the method for producing the transparent conductive film 10 is explained in the structure of FIG. 1, the structure is only exemplary, but not intended to limit the scope of the present invention.

Hereinafter, each of the method according to the present invention will be specifically described.

The above step (1) is to form a transparent layer by applying a transparent layer solution containing an organic acid metal salt to a transparent substrate.

This step is to form the transparent layer on the transparent substrate for improving transmittance using a composition containing the organic acid metal salt.

The transparent substrate can be used with various substrates on which the thin film or pattern layer can be formed easily via the coating or printing process. For example, the substrate can be selected from a glass substrate or a transparent plastic film such as polyimide (PI), polyethylenterephthalate (PET), polyethylennaphthalate (PEN), polyethersulfone (PES), Nylon, polytetrafluoroethylene (PTFE), polyetheretherketone (PEEK), polycarbonate (PC) and polyarylate (PAR). Such substrate can be used after rinsing and grease removing or used specially after a pretreatment process, where the pretreatment process can be selected from, but not limited to, plasma, ion beam, corona, oxidation or reduction, heat, etching, ultraviolet irradiation, and primer treatment using binders or additives.

The organic acid metal salt is not necessarily limited. That is, it may use any known one if it conforms to the object of the present invention.

Though the organic acid metal salt used for the present invention is not necessarily limited if it conforms to the present invention, an organic acid metal salt having a carbon number of 3 to 28 or a mixture of an organic acid metal salt containing organic metal salt having a carbon number of 3 to and organic acid are preferable. The organic acid is exemplified as butyric acid, valeric acid, acrylic acid, pivalic acid, n-hexanoic acid, t-octanoic acid, 2-ethyl-hexanoic acid, neodecanoic acid, lauric acid, stearic acid, oleic acid, naphthenic acid, dodecanoic acid and linoleic acid. The metal component of the organic acid metal salt is exemplified as Li, Na, K, Rb, Cs, Be, Mg, Ca, Sr, Ba, Ti, V, Mn, Fe, Co, Ni, Cu, Zn, Y, Zr, Nb, Mo, Ru, Rh, Pd, Ag, Cd, Hf, Ta, W, Re, Os, Ir, Pt, Au, Hg, Al, Ga, In, Tl, Ge, Sn, Pb, Sb, Bi, La, Ce, Pr, Nd, Sm and Eu. The organic metal salt is used by selecting one or more metal materials from manganese n-hexanoate, magnesium t-octanoate, lithium naphthenate, photasium neodecanoate, silver 2-ethyl hexanoate, zinc neodecanoate, cobalt stearate, nickel naphthenate, aluminum naphthenate, magnesium naphthenate, barium naphthenate, manganese naphthenate, zinc naphthenate, banadium naphthenate, zirconium naphthenate, strontium naphthenate, tin oleate, indium t-octanoate, tin diacrylate, cobalt neodecanoate, copper 2-ethyl hexanoate, iron stearate, nickel oleate, calcium neodecanoate, barium neodecanoate, cesium dodecanoate, lead linoleate and cerium naphthenate.

Further, the organic acid metal salt may be in a spherical type, a linear type, a plate type or a mixing type of them and used in a various state such as particle including nano particle, powder, flake, colloid, hybrid, paste, sol, solution state or a state mixing one or more of them.

The usage of the organic acid metal salt is not necessarily limited if it conforms to an ink characteristic of the present invention. It is preferably in a range of 0.01 wt % ~10 wt % relative to total weight of the transparent layer solution, and more preferably in a range of 0.01~1 wt %.

The transparent layer solution comprises at least one or more from the organic acid metal salts in order to improve the transmittance and solvent, stabilizer, dispersing agent, binder resin, reducing agent, surfactant, wetting agent, thixotropic agent or leveling agent as necessary.

The heat treatment of the transparent layer is performed preferably in a range of temperature of 80 to 400° C., more preferably 90 to 300° C., still more preferably 100 to 150° C., in view of physical property of the thin film. Additionally, it is desirable that the thin film is subject to the heat treatment of two or more steps performed at low and high temperature within the above range, for the purpose of making the thin film uniform. For example, it is preferable to treat it at 80 to 150° C. for 1~30 minutes and at 150 to 300° C. for 1~30 minutes.

The coating method of the transparent layer can be selected from spin coating, roll coating, spray coating, dip coating, flow coating, doctor blade and dispensing, ink-jet printing, offset printing, screen printing, pad printing, gravure printing, flexography printing, stencil printing, imprinting, xerography and lithography method, in accordance with a physical property of ink.

The step (2) of the present invention is to forming a conductive layer by applying a conductive layer solution in order to form the conductive layer allowing conductivity.

The silver complex compound for forming a conductive layer is produced by reacting the silver compound expressed by a chemical formula 1 below, and one or more compounds selected from ammonium carbamate-based compound expressed by a chemical formula 2 below, ammonium carbonate-based compound expressed by a chemical formula 3, ammonium carbonate-based compound expressed by a chemical formula 4 or a mixture thereof.

[X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and their derivatives, n is an integer of 1~4, and $R_1$ to $R_6$ is a substituting group independently selected from Hydrogen, $C_1$~$C_{30}$ aliphatic or cyclic alkyl group, aryl group or aralkyl group, alkyl and aryl groups of which a functional group is substituted, heterocyclic compound, or high molecular compound or its derivatives, in which $R_1$ and $R_2$, or $R_4$ and $R_5$ can be connected via alkylene including or not including hetero atoms with each other to form cycles.]

The compound in the chemical formula 1 is exemplified as, but not limited to, silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof.

Further, $R_1$ to $R_6$ can be selected from, but not limited to, the group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and its derivatives, and polymer such as polyallylamine or polyethyleneimine and derivatives thereof.

The ammonium carbamate-based compound in the chemical formula 2 can be one or more compounds selected from the group consisting of ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholinium morpholinecarbamate, pyridinium ethylhexylcarbamate, triethylenediaminum isopropylbicarbamate, benzylammonium benzylcarbamate, triethoxysilylpropylammonium triethoxysilylpropylcarbamate and derivatives thereof. The ammonium carbonate-based compound in the chemical formula 3 can be one or more compounds selected from the group consisting of ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, triethylenediaminum isopropylcarbonate and derivatives thereof. Further, the ammonium bicarbonate-based compound in the chemical formula 4 can be one or more compounds selected from the group consisting of ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminum bicarbonate and derivatives thereof.

Meanwhile, kinds and producing methods of the ammonium carbamate-based, the ammonium carbonate-based or ammonium bicarbonate-based compounds are not necessarily limited. For example, in U.S. Pat. No. 4,542,214 (1985 Sep. 17), from primary amine, secondary amine, tertiary amine or a mixture containing at least one and carbon dioxide, the ammonium carbamate-based compound can be produced, the ammonium carbonate-based compound can be produced if water of 0.5 mole is further added per 1 mole of the amine, and the ammonium bicarbonate compound can be produced if water of at least 1 mole is further added. At this time, they can be produced without specific solvent under a constant pressure or an increased pressure. The solvent is selected from water, alcohol such as methanol, ethanol, isopropanol and butanol, glycol such as ethylenglycol and glycerin, acetate such as ethylacetate, butylacetate and carbitolacetate, ether such as diethyether, tetrahydrofuran and dioxane, ketone such as methylethylketone and acetone, hydrocarbon such as hexane and heptane, aromatic hydrocarbon such as benzene and toluene, halogen substituted solvent such as chloroform or methylene chloride, carbon tetrachloride, or a mixture of them. And the carbon dioxide can be bubbled in a gas phase or use a dry ice in a solid phase and reacted even in a supercritical state. The derivatives of the ammonium carbamate-based compound, the ammonium carbonate-based compound or the ammonium bicarbonate-based compound can be produced in any known method beside the above-mentioned method if the resulting structure is the same. That is, it is not necessary to limit the solvent, reaction temperature, concentration or catalyst.

The organic silver complex compound or silver complex compound can be produced by reacting the ammonium carbamate-based, the ammonium carbonate-based or the ammonium bicarbonate-based compound with the silver compound. For example, at least one silver compound as expressed by the chemical formula 1 and the compound as expressed by the chemical formulas 2 to 4 or a mixture of them can be directly reacted without the solvent under the constant pressure and the increased pressure of the nitrogen atmosphere. At this time, the solvent is selected from water, alcohols such as methanol, ethanol, isopropanol and butanol, glycol such as ethylenglycol and glycerin, acetates such as ethylacetate, butylacetate, and carbitolacetate, ethers such as diethyether, tetrahydrofuran and dioxane, ketones such as methylethylketone and acetone, hydrocarbons such as hexane and heptane, aromatic hydrocarbons such as benzene and toluene, halogen substituted solvents such as chloroform, methylene chloride and carbon tetrachloride, or mixture of them.

The method of manufacturing the silver complex compound or the silver complex mixture according to the present invention has been described in Korean Patent Application No. 10-2006-0011083 applied by the inventors of this application.

The composition of the conductive layer contains the silver complex compound or the silver complex mixture, and can contain an additive such as solvent, stabilizer, dispersing agent, thin layer supplement, binder resin, reducing agent, surfactant, wetting agent, thixotropic agent or leveling agent, as necessary.

The stabilizer can be selected from, for example, amine compound such as primary amine, secondary amine or tertiary amine, the ammonium carbamate-based compound, the ammonium carbomate-based compound, the ammonium bicarbonate-based compound, or phosphorus compound such as phosphine, phosphate or phosphate, sulfur compound such as thiol or sulfide, and a mixture of them.

That is, the amine compound is exemplified as methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxyamine, ammoniumhydroxide, methoxyamine, 2-ethanolamine, methoxyethylamine, 2-hydroxy propylamine, 2-hydroxy-2-methylpropylamine, methoxypropylamine, cyanoethylamine, ethoxyamine, n-butoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethyl aminopropyltriethoxysilane, aniline, anisidine, aminobenzonitrile, benzylamine and derivatives thereof, polymer compounds such as polyallylamine or polyethyleneimine and derivatives thereof.

The ammonium carbamate-based compound is exemplified as ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate and derivatives thereof. The ammonium carbonate-based compound is exemplified as ammonium carbonate, ethylammonium ethylcarbonate, isopropylammonium isopropylcarbonate, n-butylammonium n-butylcarbonate, isobutylammonium isobutylcarbonate, t-butylammoniumt-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, triethylenediamnium isopropylcarbonate and derivatives thereof. Further, the ammonium bicarbonate-based compound is exemplified as ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminum bicarbonate and derivatives thereof.

Further, the tin compound is represented by $R_3P$, $(RO)_3P$, or $(RO)_3PO$, wherein R indicates alkyl group or aryl group having a carbon number of 1 to 20 and representatively exemplified as tributylphosphine, triphenylphosphine, triethylphosphite, triphenylphosphite, dibenzylphosphate and triethylphosphate. Further, sulfur compound is exemplified as butanethiol, n-hexanethiol, diethylsulfide, tetrahydrothiophene, allyldisulfide, mercaptobenzothiazole, alkylmercaptoacetate, tetrahydrothiophene and octylthioglycolate. Such stabilizer is not necessarily limited, as long as it conforms to an ink characteristics of the present invention. However, it preferably has contents in a range of 0.1%~90% of mole ratio relative to the silver complex compound and more preferably in a range of 1%~50%. The conductivity of the thin film can be decreased when it is above the range, and the stability of ink storage can be increased when it is below the range.

Further, thin film supplementcan be used with organic acid and organic acid derivative and composed of a mixture of one or two or more. The organic acid is exemplified as acetic acid, oxalic acid, citric acid, Lactic acid, maleic acid, acrylic acid, butyric acid, valeric acid, pivalic acid, n-hexanoic acid, t-octanoic acid, 2-ethyl-hexanoic acid, neodecanoic acid, lauric acid, stearic acid, oleic acid, naphthenic acid, dodecanoic acid and linoleic acid. The organic acid derivative is exemplified as organic acid ammonium salt such as ammonium acetate, ammonium citrate, ammonium laurate, ammonium lactate, ammonium maleate and ammonium oxalate, and organic acid matal salt having metal such as Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac and Th. The organic acid metal salt is exemplified as manganese oxalate, gold acetate, palladium oxalate, silver 2-ethyl hexanoate, silver octanoate, silver neodecanoate, cobalt stearate, nickel naphthenate and cobalt naphthenate. The usage of the thin film supplement is not necessarily limited, though it is preferably in a range of 0.1%~25% relative to silver complex compound or mixture. The thin film can not be uniformly formed when it is above the range, and the crack can be happened on the thin film when it is below the range.

The solvent can be often needed in order to control viscosity of the silver solution or smooth formation of the thin film. The solvent is exemplified as water, alcohols such as methanol, ethanol, isopropanol, 1-methoxypropanol, butanol, ethylhexyl alcohol, and terpineol, glycol such as ethylene glycol and glycerin, a kind of actates such as ethylacetate, butylacetate, methoxypropylacetate, carbitolacetate, and ethylcarbitolacetate, ethers such as methylcellosolve, butylcellosolve, diethylether, tetrahydrofuran, and dioxane, ketones such as methyethylketone, acetone, dimethylformamide, and 1-methyl-2-pyrrolidone, hydrocarbons such as hexane, heptane, dodecane, paraffin oil and mineral spirit, aromatic hydrocarbons such as benzene, toluene and xylene, halogen substituted solvents such as chloroform, methylene chloride, and carbontetrachloride, acetonitrile, and dimethylsulfoxide and mixture of them.

The heat treatment of the conductive layer is performed preferably in a temperature of 80 to 400° C., more preferably 90 to 300° C., still more preferably 100 to 150° C., in view of a physical property of the thin film. Additionally, it is desirable that the thin film is subject to the heat treatment of two or more steps performed at low and high temperature within the above range, for the purpose of making the thin film uniform. For example, it is preferable to treat it at a temperature of 80 to 150° C. for 1~30 minutes and at 150~300° C. for 1~30 minutes.

The coating method of the conductive layer can be selected from spin coating, roll coating, spray coating, dip coating, flow coating, doctor blade and dispensing, ink-jet printing, offset printing, screen printing, pad printing, gravure printing, flexography printing, stencil printing, imprinting, xerography, and lithography method, in accordance with a physical property of ink.

The step (3) of the present invention is to form a protective layer of the conductive layer by applying inorganic oxide or mercaptan compound in order to prevent changes in the conductive layer over time.

The above protective layer can be used with inorganic oxide such as silica ($SiO_2$), titania, zirconia and zinc oxide at a state of sol or colloid, or mercaptan compound such as, preferably, mercaptan into which alkyl or aryl group having a carbon number of 2 to 24 is introduced, for example, 1-hexyl mercaptan, dodecyl mercaptan, lauryl mercaptan, hexadecyl mercaptan, octadecyl mercaptan, benzomercaptan, mercapto acetic acid, mercapto benzyl alcohol, mercapto ethanol, mercapto ethylether, mercapto imidazole, mercapto pyridine, mercaptophenol, 1,2-ethandithiol, 1,2-propandithiol or 2,3-dimercapto-1-propanol. The material of the protective layer can be used in various manners by mixing one or two or more.

The heat treatment of the protective layer is performed preferably at a temperature of 50 to 300° C., more preferably 60 to 200° C., still more preferably 70 to 150° C., in view of a physical property of the thin film. Additionally, it is desirable that the thin film is subject to the heat treatment of two or more steps performed at low and high temperature within the above range, for the purpose of making the thin film uniform. For example, it is preferable to treat it at a temperature of 80 to 150° C. for 1 to 30 minutes and at a temperature of 150 to 300° C. for 1 to 30 minutes.

The coating method of the protective layer can be selected from spin coating, roll coating, spray coating, dip coating, flow coating, doctor blade and dispensing, ink-jet printing, offset printing, screen printing, pad printing, gravure printing, flexography printing, stencil printing, imprinting, xerography, and lithography, in accordance with physical property of ink.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

| 1: substrate layer | 2: transparent layer |
|---|---|
| 3: conductive layer | 4: protective layer |
| 10: transparent conductive film | |

BEST MODE

Hereinafter, the embodiments of the present invention will be described in detail with reference to accompanying drawings, though the embodiments is only example of the present invention and not intended to limit a scope of the present invention.

Production of Transparent Layer Solution

[Embodiment 1]

A methanol 10 ml and naphthenic acid 5 g are added within a Schlenk flask of 250 ml equipped with a stirring machine, and weight % ammonia water solution of 2 ml is added while stirring them at a temperature of 80° C., to cause them to be reacted for 1 hour. Then, barium naphthenate solution is produced by slowly adding Barium nitrate water solution 9.3 ml of 20 weight % into the Schlenk flask. The above solution is filtered to take barium naphthenate, which is then solved into hexane again and filtered, thereby producing barium naphthenate solution with impurities being removed. By diluting this solution with barium contents of 0.3weight % in the hexane, the ink composition for the transparent layer is produced.

[Embodiment 2]

A methanol 10 ml and neodecanoic acid 5 g are added within a Schlenk flask of 250 ml equipped with a stirring machine, and weight % ammonia water solution of 4 ml is added while stirring them at a temperature of 80° C., to cause them to be reacted for 1 hour. Then, calcium neodecanoate solution is produced by slowly adding calcium nitrate water solution 8 ml of 30 weight % into the Schlenk flask. The above solution is filtered to take calcium neodecanoate, which is then solved into hexane again and filtered, thereby producing calcium neodecanoate solution with impurities being removed. By diluting this solution with calcium contents of 0.3 weight % in the hexane, the ink composition for the transparent layer is produced.

[Embodiment 3]

A methanol 10 ml and naphthenic acid 5 g are added within a Schlenk flask of 250 ml equipped with a stirring machine, and weight % ammonia water solution of 2 ml is added while stirring them at a temperature of 80° C., to cause them to be reacted for 1 hour. Then, aluminum naphthenate solution is produced by slowly adding aluminum nitrate water solution 13.4 ml of 20 weight % into the Schlenk flask. The above solution is filtered to take aluminum naphthenate, which is then solved into hexane again and filtered, thereby producing aluminum naphthenate solution with impurities being removed. By diluting this solution with aluminum contents of 0.2 weight % in the hexane, the ink composition for the transparent layer is produced.

[Embodiment 4]

A methanol 10 ml and neodecanoic acid 5 g are added within a Schlenk flask of 250 ml equipped with a stirring machine, and weight % ammonia water solution of 4 ml is added while stirring them at a temperature of 80° C., to cause them to be reacted for 1 hour. Then, cobalt neodecanoate solution is produced by slowly adding cobalt nitrate water solution 21.1 ml of 20 weight % into the Schlenk flask. The above solution is filtered to take cobalt neodecanoate, which is then solved into hexane again and filtered, thereby producing cobalt neodecanoate solution with impurities being removed. By diluting this solution with cobalt contents of 0.2 weight % in the hexane, the ink composition for the transparent layer is produced.

[Embodiment 5]

A methanol 10 ml and naphthenic acid 5 g are added within a Schlenk flask of 250 ml equipped with a stirring machine, and 28 weight % ammonia water solution of 2 ml is added while stirring them at a temperature of 80° C., to cause them to be reacted for 1 hour. Then, manganese naphthenate solution is produced by slowly adding manganese nitrate water solution 1.9 ml of 45 weight % into the Schlenk flask. The above solution is filtered to take manganese naphthenate, which is then solved into hexane again and filtered, thereby producing manganese naphthenate solution with impurities being removed. By diluting this solution with manganese contents of 0.4 weight % in the hexane, the ink composition for the transparent layer is produced.

[Embodiment 6]

A methanol 10 ml and naphthenic acid 5 g are added within a Schlenk flask of 250 ml equipped with a stirring machine, and weight % ammonia water solution of 2 ml is added while stirring them at a temperature of 80° C., to cause them to be reacted for 1 hour. Then, zinc naphthenate solution is produced by slowly adding zinc nitrate water solution 10.6 ml of 20 weight % into the Schlenk flask. The above solution is filtered to take zinc naphthenate, which is then solved into hexane again and filtered, thereby producing zinc naphthenate solution with impurities being removed. By diluting this solution with zinc contents of 0.3 weight % in the hexane, the ink composition for the transparent layer is produced.

[Embodiment 7]

A methanol 10 ml and naphthenic acid 5 g are added within a

Schlenk flask of 250 ml equipped with a stirring machine, and weight % ammonia water solution of 2 ml is added while stirring them at a temperature of 80° C., to cause them to be reacted for 1 hour. Then, magnesium naphthenate solution is produced by slowly adding the Schlenk flask with drops of magnesium nitrate water solution 9.2 ml of 20 weight % into the Schlenk flask. The above solution is filtered to take magnesium naphthenate, which is then solved into hexane again and filtered, thereby producing magnesuim naphthenate solution with impurities being removed. By diluting this solution with magnesuim contents of 0.2 weight % in the hexane, the ink composition for the transparent layer is produced.

[Embodiment 8]

The transparent layer solution is produced by mixing the solution produced in the embodiment 1 and the solution produced in the embodiment 2 at a ratio of 50:50 vol %.

[Embodiment 9]

The transparent layer solution is produced by mixing the solution produced in the embodiment 4 and the solution produced in the embodiment 7 at a ratio of 50:50 vol %.

Production of Conductive Layer Solution

[Embodiment 10]

A 2-ethylhexylamonium 2-ethylhexyl carbamate 33.7 g (141.9 mmol) is added within a Schlenk flask of 250 ml equipped with a stirring machine, and silver oxide of 10.0 g (43.1 mmol) is added to cause them to be reacted while stirring them at a room temperature for 2 hours. With the reaction is advanced, black slurry is initially obtained, which is then grown into complex compound with its color being lighter and finally into yellow-colored transparent liquid-phase silver complex compound 43.7 g having viscosity of 0.31 pa·s. As a result of heat analysis (TGA), a content of silver is 22.0 weigh %. The conductive layer solution is produced by diluting the silver complex compound with methanol to cause a content of silver to be 0.75 weight %.

[Embodiment 11]

The conductive layer solution is produced by diluting the silver complex compound produced by the embodiment 10 with methanol to cause a content of silver to be 1.0 weight %.

[Embodiment 12]

The conductive layer solution is produced by diluting the silver complex compound produced by the embodiment 10 with methanol to cause a content of silver to be 0.3 weight %.

Production of Protective Layer Solution

[Embodiment 13]

The protective layer solution is produced by diluting silica sol (product name: NYASIL 5, manufacturing company: NYACOL) solution having a size of 5 nm with methanol to cause a content of silica to be 1 weight %.

[Embodiment 14]

The protective layer solution is produced by mixing 1-hexyl mercaptan (manufacturing company: Aldrich) of 10 g and methanol of 350 g and then stirring them for 1 hour.

Production of Transparent Conductive Film

[Embodiment 15]

The glass substrate for use in spin coating is prepared to produce the transparent conductive layer and dried at 50° C. for at least 30 minutes by a drier after removing dusts on a surface of the substrate using ethanol. The transparent layer is produced by locating the dried glass substrate on a spin coater and pouring the composition 20 ml of the embodiment 2 over the glass substrate, which is rotated at 300 rpm and then dried at a temperature of 100° C. for 1 minute. After pouring the composition 20 ml of the embodiment 12 over the transparent layer, they are rotated at 300 rpm to form the conductive layer and then dried at a temperature of 120 for 2 minutes, thereby producing the transparent conductive film. A result of surface resistance, transmittance and change over time of the transparent conductive film is shown in Table 1.

[Embodiment 16]

The glass substrate for use in spin coating is prepared to produce the transparent conductive layer and dried at 50° C. for at least 30 minutes by a drier after removing dusts on a surface of the substrate using ethanol. The transparent layer is produced by locating the dried glass substrate on a spin coater and pouring the composition 20 ml of the embodiment 2 over the glass substrate, which is rotated at 300 rpm and then dried at a temperature of 100° C. for 1 minute. After pouring the composition 20 ml of the embodiment 12 over the transparent layer, they are rotated at 300 rpm to form the conductive layer and then dried at a temperature of 120° C. for 2 minutes, followed by rotating the composition of the embodiment 13 at 300 rpm to form the protective layer, thereby producing the transparent conductive film. A result of surface resistance, transmittance and change over time of the transparent conductive film produced is shown in Table 1.

[Embodiment 17]

This is performed in the same manner as the embodiment 16 except for forming the conductive layer using the embodiment 11. A result of surface resistance, transmittance and change over time of the transparent conductive film produced is shown in Table 1.

[Embodiment 18]

This is performed in the same manner as the embodiment 16 except for forming the transparent layer using the embodiment 1 and the protective layer using the embodiment 14. A result of surface resistance, transmittance and change over time of the transparent conductive film produced is shown in Table 1.

[Embodiment 19]

This is performed in the same manner as the embodiment 16 except for forming the transparent layer using the embodiment 3. A result of surface resistance, transmittance and change over time of the transparent conductive film produced is shown in Table 1.

[Embodiment 20]

This is performed in the same manner as the embodiment 16 except for forming the transparent layer using the embodiment 4. A result of surface resistance, transmittance and change over time of the transparent conductive film produced is shown in Table 1.

[Embodiment 21]

This is performed in the same manner as the embodiment 16 except for forming the transparent layer using the embodiment 5. A result of surface resistance, transmittance and change over time of the transparent conductive film produced is shown in Table 1.

[Embodiment 22]

This is performed in the same manner as the embodiment 16 except for forming the transparent layer using the embodiment 6. A result of surface resistance, transmittance and change over time of the transparent conductive film produced is shown in Table 1.

[Embodiment 23]

This is performed in the same manner as the embodiment 16 except for forming the transparent layer using the embodiment 7. A result of surface resistance, transmittance and change over time of the transparent conductive film produced is shown in Table 1.

[Embodiment 24]

This is performed in the same manner as the embodiment 16 except for forming the transparent layer using the embodiment 8. A result of surface resistance, transmittance and change over time of the transparent conductive film produced is shown in Table 1.

[Embodiment 25]

This is performed in the same manner as the embodiment 16 except for forming the transparent layer using the embodiment 9. A result of surface resistance, transmittance and change over time of the transparent conductive film produced is shown in Table 1.

COMPARATIVE EXAMPLE 1

The glass substrate for use in spin coating is prepared to produce the transparent conductive layer and dried at 50° C. for at least 30 minutes by a drier after removing dusts on a surface of the substrate using ethanol. The transparent conductive layer is produced by locating the dried glass substrate on a spin coater and pouring the composition 20 ml of the embodiment 12 over the glass substrate, which is rotated at 300 rpm and then dried at a temperature of 120° C. for 2 minute. A result of a surface resistance, a transmittance and a change over time of the transparent conductive film produced is shown in Table 1.

COMPARATIVE EXAMPLE 2

The glass substrate for use in spin coating is prepared to produce the transparent conductive layer and dried at 50° C. for at least 30 minutes by a drier after removing dusts on a surface of the substrate using ethanol. The transparent conductive layer is produced by locating the dried glass substrate on a spin coater and pouring PEDOT/PSS (available from Bayer company) of 20 ml over the glass substrate, which is rotated at 300 rpm and then dried at a temperature of 120° C. for 2 minute. A result of a surface resistance, a transmittance and a change over time of the transparent conductive film produced is shown in Table 1.

TABLE 1

Physical data of the transparent conductive layer produced in the embodiments and the comparative examples

| Embodiment | Heat treatment temperature after forming the conductive layer (° C.) | Surface resistance (Ω/□) | Transmittance (% at 50 nm) | Change over time | Remark |
|---|---|---|---|---|---|
| Embodiment 15 | 120 | 25 | 74 | Δ | — |
| Embodiment 16 | 120 | 23 | 84 | ○ | — |
| Embodiment 17 | 120 | 16 | 74 | ○ | — |
| Embodiment 18 | 120 | 25 | 78 | ○ | — |
| Embodiment 19 | 120 | 27 | 76 | ○ | — |
| Embodiment 20 | 120 | 30 | 78 | ○ | — |
| Embodiment 21 | 120 | 25 | 79 | ○ | — |
| Embodiment 22 | 120 | 28 | 81 | ○ | — |
| Embodiment 23 | 120 | 30 | 82 | ○ | — |
| Embodiment 24 | 120 | 27 | 79 | ○ | — |
| Embodiment 25 | 120 | 28 | 78 | ○ | — |
| Comparative 1 | 120 | 33 | 53 | X | — |
| Comparative 2 | 120 | 4500 | 91 | ○ | — |

(1) Estimation of change over time: measurement of change in surface resistance after 30 days since the transparent conductive film is produced.
○: without change in the surface resistance
Δ: change in the surface resistance is within 10%
X: change in the surface resistance is above 10%
(2) Estimation of conductivity: measuring the surface resistance by AIT CMT-SR1000N after producing a rectangular sample of pattern 1 cm × 3 cm.
(3) Estimation of transmittance: measuring transmittance by spectrophotometer (PerkinElmer Model lambla-650) after producing a rectangular sample of pattern 2 cm × 2 cm.

INDUSTRIAL APPLICABILITY

The present invention relates to the transparent conductive film in a form of complex multi-layer film comprising at least one layer using the silver complex compound having special structure and the organic acid metal salt and the method for producing the same.

The present invention provides the transparent conductive film which has excellent surface resistance and transmittance and the method for producing the same.

According to the present invention, it is possible to achieve the transparent conductive film which has excellent conductivity and transmittance, as well as simple production processes.

Further, it is possible to provide the conductive film used as necessary component of the electrical/electronic equipment such as means for applying power supply to a display device, a layer for shielding electromagnetic waves of consumer electronics, and a transparent electrode in a variety of display fields such as LCD, OLED, FED, PDP, flexible display and an electronic paper.

The invention claimed is:

1. A method for producing a transparent conductive film in the form of a complex multi-layer film, comprising steps of:
   forming a transparent layer by applying a transparent layer solution consisting of one or more organic acid metal salt, solvent and optionally at least one additive selected from a group consisting of stabilizer, dispersing agent, binder resin, reducing agent, surfactant, wetting agent, thixotropic agent and leveling agent to a transparent substrate,
   wherein the organic acid metal salt comprises an organic acid selected from the group consisting of butyric acid, valeric acid, acrylic acid, pivalic acid, n-hexanoic acid, 2-ethyl-hexanoic acid, neodecanoic acid, lauric acid, stearic acid, oleic acid, naphthenic acid, dodecanoic acid and linoleic acid; and wherein the organic acid metal salt comprises a metal selected from the group consisting of Li, Na, K, Rb, Cs, Be, Mg, Ca, Sr, Ba, V, Mn, Fe, Co, Ni, Cu, Y, Zr, Nb, Mo, Ru, Rh, Pd, Ag, Cd, Hf, Ta, W, Re, Os, Ir, Pt, Au, Hg, Al, Ga, Tl, Ge, Pb, Bi, La, Ce, Pr, Nd, Sm and Eu; and forming a conductive layer by applying to the transparent layer a conductive layer solution including a silver complex compound obtained by reacting the silver compound expressed by a chemical formula 1 below, and one or more compounds selected from ammonium carbamate-based compound expressed by a chemical formula 2 below, ammonium carbonate-based compound expressed by a chemical formula 3, ammonium carbonate-based compound expressed by a chemical formula 4 or a mixture thereof, wherein the transparent layer is in direct contact with both the substrate layer and the conductive layer

[Chemical Formula 1]

$Ag_nX$

[Chemical Formula 2]

[Chemical Formula 3]

[Chemical Formula 4]

[where X is a substituent selected from the group consisting of oxygen, sulfur, halogen, cyano, cyanate, carbonate, nitrate, nitrite, sulfate, phosphate, thiocyanate, chlorate, perchlorate, tetrafluoroborate, acetylacetonate, carboxylate and their derivatives, n is an integer of 1~4, and $R_1$ to $R_6$ is a substituting group independently selected from Hydrogen, $C_1$~$C_{30}$ aliphatic or cyclic alkyl group, aryl group or aralkyl group, alkyl and aryl groups of which a functional group is substituted, heterocyclic compound, or high molecular compound or its derivatives, in which $R_1$ and $R_2$, or $R_4$ and $R_5$ can be connected via alkylene including or not including hetero atoms with each other to form cycles].

2. The method according to claim 1, wherein the transparent substrate is polyimide (PI), polyethylenterephthalate (PET), polyethylennaphthalate (PEN), polyethersulfone (PES), Nylon, polytetrafluoroethylene (PTFE), polyetheretherketone (PEEK), polycarbonate (PC) and polyarylate (PAR) or a glass.

3. The method according to claim 1, wherein the organic acid metal salt is used in single or in combination with at least one selected from a group consisting of manganese n-hexanoate, lithium naphthenate, photasium neodecanoate, silver 2-ethyl hexanoate, cobalt stearate, nickel naphthenate, aluminum naphthenate, magnesium naphthenate, barium naphthenate, manganese naphthenate, banadium naphthenate, zirconium naphthenate, strontium naphthenate, cobalt neodecanoate, copper 2-ethyl hexanoate, iron stearate, nickel oleate, calcium neodecanoate, barium neodecanoate, cesium dodecanoate, lead linoleate and cerium naphthenate.

4. The method according to claim 1, wherein the organic acid metal salt is 0.01 to 10 weight % relative to total weight of the transparent layer solution.

5. The method according to claim 1, wherein the silver compound is a mixture of one or two or more selected from a group consisting of silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof.

6. The method according to claim 1, wherein $R_1$ to $R_6$ are selected from a group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and its derivatives, and polymer such as polyallylamine or polyethyleneimine and derivatives thereof.

7. The method according to claim 1, wherein ammonium carbamate-based compound in the chemical formula 2 can be one or more compounds selected from the group consisting of ammonium carbamate, ethylammonium ethylcarbamate, isopropylammonium isopropylcarbamate, n-butylammonium n-butylcarb am ate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneimineammonium hexamethyleneiminecarbamate, morpholinium morpholinecarbamate, pyridinium ethylhexylcarbamate, triethylenediaminum isopropylbicarbamate, benzylammonium benzylcarbamate, triethoxysilylpropylammonium triethoxysilylpropylcarbamate and derivatives thereof, the ammonium carbonate-based compound in the chemical formula 3 is one or more compounds selected from the group consisting of ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneimineammonium hexamethyleneiminecarbonate, morpholineammonium morpholinecarbonate, benzylammonium benzylcarbonate, triethoxysilylpropylammonium triethoxysilylpropylcarbonate, triethylenediaminum isopropylcarbonate and derivatives thereof, and the ammonium bicarbonate-based compound in the chemical formula 4 is one or more compounds selected from the group consisting of ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminum bicarbonate and derivatives thereof.

8. The method according to claim 1, wherein the conductive layer solution further comprises at least one additive selected from a group consisting of solvent, stabilizer, the thin film supplement, dispersing agent, binder resin, reducing agent, surfactant, wetting agent, thixotropic agent, or leveling agent as necessary.

9. The method according to claim 8, wherein the solvent is one or more selected from a group consisting of water, alcohols, glycols, acetates, ethers, ketones, aliphatic hydrocarbons, aromatic hydrocarbons, or halogen-substituted hydrocarbons.

10. The method according to claim 8, wherein the stabilizer is used with at least one selected from a group consisting of amine compound, ammonium carbamate-based compound expressed by a chemical formula 2 below, an ammonium carbonate-based compound expressed by a chemical formula 3 below, an ammonium bicarbonate-based compound expressed by a chemical formula 4 below, phosphorous compound or sulfur compound

[Chemical Formula 2]

[Chemical Formula 3]

[Chemical Formula 4]

[where $R_1$ to $R_6$ is a substituting group independently selected from Hydrogen, $C_1$~$C_{30}$ aliphatic or cyclic alkyl group, aryl group or aralkyl group, alkyl and aryl groups of which a functional group is substituted, heterocyclic compound, or high molecular compound or its derivatives, in which $R_1$ and $R_2$, or $R_4$ and $R_5$ can be connected via alkylene including or not including hetero atoms with each other to form cycles].

11. The method according to claim 10, wherein the phosphorous compound is selected from compounds expressed by chemical formulas 5 to 7 below $R_3P$ [chemical formula 5]

$(RO)_3P$ [chemical formula 6]

$(RO)_3PO$ [chemical formula 5]

[where R in the chemical formulas 5 to 7 is a substituted group selected from alkyl or aryl group having a carbon number of 1 to 20].

12. The method according to claim 10, wherein the sulfur compound is selected from a group consisting of butanethiol, n-hexanethiol, diethylsulfide, tetrahydrothiophene, allyldisulfide, mercaptobenzothiazole, alkylmercaptoacetate, tetrahydrothiophene and octylthioglycolate.

13. The method according to claim 8, wherein the thin film supplement is one or a mixture of two or more selected from a group consisting of organic acid, organic acid ammonium salt or organic acid metal salt.

14. The method according to claim 13, wherein the organic acid is selected from a group consisting of acetic acid, oxalic acid, citric acid, Lactic acid, maleic acid, acrylic acid, butyric acid, valeric acid, pivalic acid, n-hexanoic acid, t-octanoic acid, 2-ethyl-hexanoic acid, neodecanoic acid, lauric acid, stearic acid, oleic acid, naphthenic acid, dodecanoic acid, and linoleic acid, and the metal of the organic acid metal salt is selected from a group consisting of Au, Cu, Ni, Co, Pd, Pt, V, Mn, Fe, Cr, Zr, Nb, Mo, W, Ru, Cd, Ta, Re, Os, Ir, Al, Ga, Ge, In, Pb, Bi, Sm, Eu, Ac and Th.

15. The method according to claim 1, further comprising a step of forming a protective layer by applying inorganic oxide or mercaptan compound after forming the conductive layer.

16. The method according to claim 15, wherein the inorganic oxide is a mixture of one or two or more selected from a group consisting of silica ($SiO_2$), titania, zirconia or zinc oxide.

17. The method according to claim 16, wherein the mercaptan compound is one or a mixture of two or more selected from a group consisting of 1-hexyl mercaptan, dodecyl mercaptan, lauryl mercaptan, hexadecyl mercaptan, octadecyl mercaptan, benzomercaptan, mercapto acetic acid, mercapto benzyl alcohol, mercapto ethanol, mercapto ethylether, mercapto imidazole, mercapto pyridine, mercaptophenol, 1, 2-ethandithiol, 1, 2-propandithiol or 2,3 -dimercapto -1-propanol.

18. The method according to claim 15, wherein the mercaptan compound is selected from mercaptan compounds into which alkyl or aryl group having a carbon number of 2 to 24 is introduced.

19. The method according to claim 1 or claim 15, wherein the applying step is selected from a group consisting of spin coating, roll coating, spray coating, dip coating, flow coating, doctor blade and dispensing, ink-jet printing, offset printing, screen printing, pad printing, gravure printing, flexography printing, stencil printing, imprinting, xerography, and lithography method.

20. The method according to claim 1 or claim 15, further comprising a heat treatment step after the transparent layer solution is applied, after the conductive layer solution is applied, or after inorganic oxide is applied.

* * * * *

UNITED STATES PATENT AND TRADEMARK OFFICE
CERTIFICATE OF CORRECTION

PATENT NO. : 9,556,065 B2
APPLICATION NO. : 12/663933
DATED : January 31, 2017
INVENTOR(S) : Hyun-Nam Cho et al.

It is certified that error appears in the above-identified patent and that said Letters Patent is hereby corrected as shown below:

In the Claims

Column 16, Line 27, Claim 7, delete "n-butylcarb am ate," and insert -- n-butylcarbamate, --

Column 18, Line 35, Claim 17, delete "1, 2-ethandithiol," and insert -- 1,2-ethanedithiol, --

Column 18, Line 35, Claim 17, delete "1, 2-propandithiol" and insert -- 1,2-propanedithiol --

Signed and Sealed this
Eleventh Day of April, 2017

Michelle K. Lee
*Director of the United States Patent and Trademark Office*